May 31, 1949.  J. RUSSELL  2,471,546
RODENT TRAP
Filed Sept. 29, 1944  2 Sheets-Sheet 1
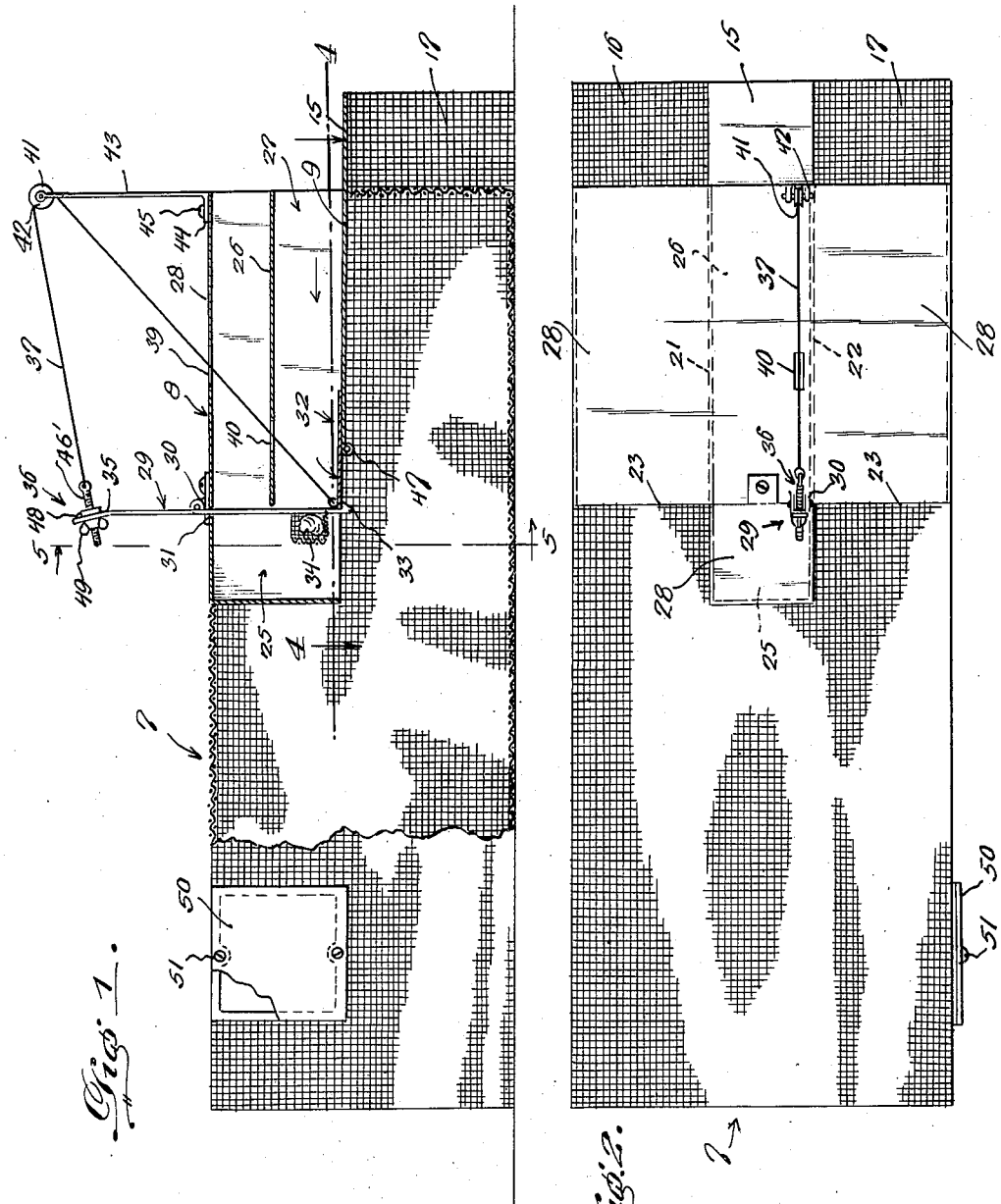
Inventor
Joseph Russell, May 31, 1949.  J. RUSSELL  2,471,546
RODENT TRAP
Filed Sept. 29, 1944    2 Sheets-Sheet 2
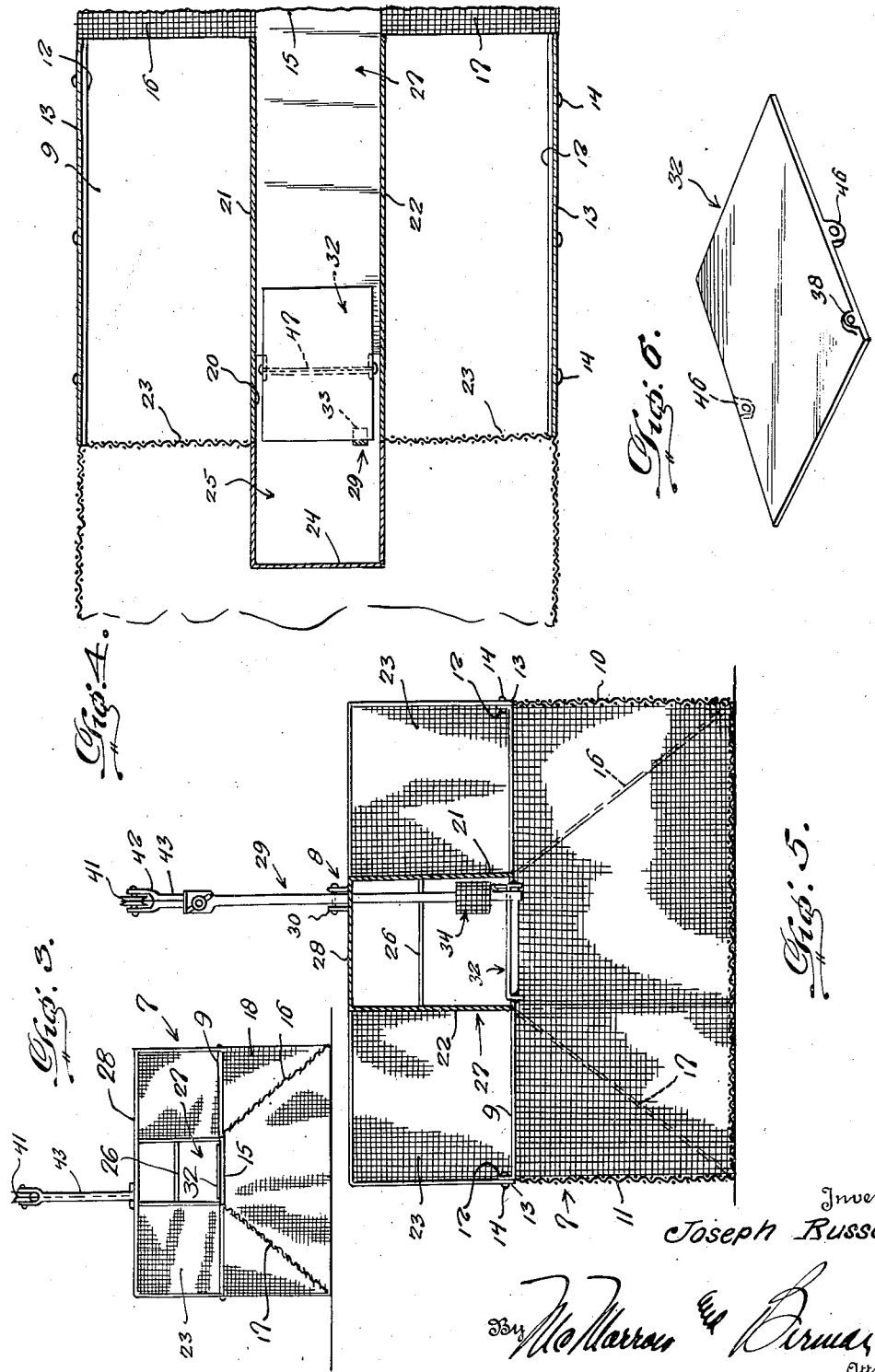

Patented May 31, 1949

2,471,546

UNITED STATES PATENT OFFICE 2,471,546

RODENT TRAP

Joseph Russell, Bailey, Mich., assignor of one-half to John Hoefling, Ravenna, Mich.

Application September 29, 1944, Serial No. 556,427

3 Claims. (Cl. 43—70)

1

My invention relates to an improved rodent trap of the baited cage and automatically resetting trap door type, the primary objects of the invention being to provide simplified low cost construction in such a trap together with more dependable operation, and ease of servicing.

The various features and advantages of the invention will appear in the following description and appended drawings showing for exemplary purposes only a preferred embodiment of my invention.

In the drawings—

Figure 1 is a side elevation of said embodiment partly broken away to reveal internal structure and showing the trap door and its resetting mechanism in set or closed position;

Figure 2 is a top plan view of said embodiment;

Figure 3 is a front end elevation thereof;

Figure 4 is a fragmentary horizontal section on an enlarged scale taken just above the tunnel floor on line 4—4 of Figure 1;

Figure 5 is a transverse section on an enlarged scale taken through Figure 1 along the line 5—5, and, Figure 6 is an enlarged perspective view of the trap door.

Referring to the drawings in detail, the numeral 7 generally designates a metal such as copper or similar suitable material screen box of elongated form, the upper front end portion of which is cut down to accommodate a framework forming a part of the entrance and trap door assembly, made of sheet metal or similar suitable imperforate material bent to shape and secured to adjacent edges of walls of the screen box 7.

The framework 8 consists of a horizontal plate 9 extending the width of the box 7 and secured at the side edges to the upper ends of the reduced screen side wall portions 10, 11 by means of vertical flanges 12 integral with plate 9 which face on their outer sides vertical strips 13, Figures 4 and 5, to which the flanges are bolted or riveted as at 14 with the upper edges of the side wall portions 10, 11 clamped therebetween.

The plate 9 has a centralized narrow forwardly projecting portion 15 to the side edges of which are attached the upper ends of the screen material ramps 16, 17 which have their rear edges secured to the reduced front end wall 18 of the box 7, which ramps reach the side edges of the plate 9 of the box 7, and up which the rodents travel to reach the platform 15. The portion of the plate 9 extending rearwardly from the platform forms the tunnel floor, this floor terminat-

2 ing in a trap door opening 20 communicating with the interior of the box 7 and through which opening the rodent drops into the box from which it cannot escape.

Extending from the sides of the portion of the plate 9 forming the tunnel floor are side wall plates 21, 22 which extend to the level of the top of the box 7 and rearwardly of the front edges of the upper box screen wall portions 23 which are secured to the tunnel sidewall plates 21, 22 and close off this portion of the box.

A plate 24 extends between the rear edges of the tunnel sidewall plates to define the bait chamber 25 located rearwardly of the front screen wall portions 23. The bottom of the bait chamber is open.

A horizontal plate partition 26 extending between the tunnel side wall plates 21, 22 forms the roof of the tunnel which is generally designated 27, the roof partition 26 being substantially spaced below the frame work top plate 28 which is on a level with the top of the box and secured to the upper edges of the tunnel side wall plates 21, 22. The front end of the tunnel opens onto the platform, and the front end of the space in the framework above the tunnel roof 26 may also be open at its front and rear ends. As shown in Figure 1, the tunnel roof plate 26 extends rearwardly only as far as the upper front screen wall portions 23 while the top plate 28 extends rearwardly beyond the latter portions to form a cover for the bait chamber. The part or portion of the plate 28 which is positioned over the bait chamber 25 is connected at its edges to the side wall plates 21 and 22. The remaining major part or portion of the plate 28 is connected to the wall strips 13.

Within the bait chamber 25 swings the lower part of the vertical bait arm 29 which is hinged intermediate its ends on bracket 30 mounted adjacent a bait arm accommodating opening 31 at one side of the top plate located at the front of the bait chamber, whereby in the set position of the bait arm, in which position the trap door 32 is held closed by a latch hook 33 on the lower end of the arm 29, the arm is in approximately perpendicular position.

The rear of the lower part of the bait arm has a bait containing cage 34 positioned in the bait chamber and positioned within the rear opening of the tunnel. It is toward this bait cage that the rodents are attracted by the smell of the bait to travel up one of the ramps and rearwardly along the tunnel and onto the trap door 32.

The rodent in reaching for the bait in the cage 34 pushes against the cage and on the lower part of the arm 29 while standing on the trap door, whereby the arm 29 is swung rearwardly so that the latch hook 33 is withdrawn from under the rear edge of the trap door and the trap door tilts downwardly and drops the rodent into the screen box. The rodents thus delivered into the box become trapped therein alive and can be readily exterminated by immersing the box in a pail of water.

The bait arm 29 is delicately balanced so that the slightest push by a rodent against the lower part thereof is sufficient to disengage the latch hook 33 and permit the trap door to drop under the weight of the rodent. The delicate balancing of the bait arm in conjunction with the trap door is accomplished by providing the upper part of the bait arm sufficiently long and by turning the upper end thereof rearwardly at 35 and providing the same with an adjustable cable anchor 36, acting to urge both the bait arm and trap door to the position of Figure 1.

One end of the cable 37 is secured to the eye of the adjustable anchor 36 and the other end to an eye 38 on the bait arm side of the trap door 32, intermediate portions of the cable passing through accommodating openings 39 and 40 in the top plate 28 and tunnel roof plate 26, after passing over the free pulley 41 carried by a fork 42 on the upper end of a vertical standard 43 having a flange 44 on its lower end riveted or bolted at 45 to the front end of the top plate 28.

The trap door 32 is a rectangular plate having depending hinge ears 46 at its side edges positioned substantially midway between its front and rear edges and turning on a rod 47 suitably fixed at the rear edge of the plate 9 and adjacent to the trap door opening 20, so that in the closed position (shown in Figure 1), the front half of the trap door rests upon the rear part of the plate 9 approximately level therewith, with the rear half of the trap door closing the opening 20 with sufficient clearance at its sides to ensure free action of the trap door. The rear edge of the trap door (as shown in Figure 4) is substantially even with the upper screen wall 23 and the rear edge of the tunnel roof 26. The front half of the trap door is slightly longer than the rear half to exert a slight closing effect on the trap door to aid in returning it to closed, set position after operation. It is obvious that rearward pressure exerted by a rodent on the lower part of the bait arm 29 disengages the latch hook 33 to permit the trap door to fall, and that the return of the bait arm toward normal balanced perpendicular position causes the cable to pull the trap door upwardly to closed position, and the latch hook 33 reengages under and holds the trap door in closed position, ready for operation by another rodent.

The cable 37 may be easily adjusted to the proper length to secure accurate and balanced action of the parts, by means of the adjustable anchor 36, which includes the threaded shank 46' traversing the upper end of the bait arm, the nut 48 at one side thereof and the thumb or wing nut 49 at the other side thereof.

An access door 50 with appropriate securing means 51 is provided in one side of the box 7.

It will be understood that such changes in details of construction and arrangement of parts as are within the skill of workers in this art, and which are comprehended by the appended claims, are included within the scope of the present invention.

What is claimed is:

1. A rodent trap comprising a box for captive reception of the rodents, a framework supported on said box above its floor and comprising an access tunnel opening at its outer end to receive a rodent and having a floor provided adjacent the inner end of the tunnel with a trap door opening through which the rodent can fall into said box, a normally horizontal trap door freely hinged on said framework and closing said trap door opening in its horizontal position and arranged to tilt downwardly into said opening under the weight of a rodent, a bait chamber at the inner end of said tunnel, a free-swinging bait arm pivoted to depend into said bait chamber and biased gravitationally to assume a normal vertical position therein, a bait container on the bait arm and normally positioned at the inner end of the tunnel whereby a slight pressure against said arm by a rodent standing on the trap door is sufficient to actuate said arm into a release position, a detent on said arm engaging under the trap door to hold the same closed in the normal position of the bait arm, and coordinating means effectively connecting the bait arm and the trap door whereby inward actuation of the bait arm by the rodent withdraws said detent and releases the trap door to tilt downwardly under the weight of the rodent and deposit the rodent into said box, and whereby subsequent gravitational return of the bait arm toward the normal vertical position operates to reset the trap door in closed position and reengage the bait arm detent therewith.

2. A rodent trap according to claim 1, wherein said coordinating means comprises a pulley mounted on said framework and a cable trained thereover and secured at its opposite ends to the bait arm and trap door, respectively.

3. A rodent trap according to claim 1, wherein said framework comprises a horizontal substantially imperforate plate forming the top wall of a portion of said box and forming the floor for said tunnel, laterally spaced plates rising therefrom forming sidewalls of said tunnel and of said bait chamber, and a further horizontal plate extending between the tunnel sidewalls to provide a tunnel roof.

JOSEPH RUSSELL.

REFERENCES CITED

The following references are of record in the file of this patent:

UNITED STATES PATENTS

| Number | Name | Date |
|---|---|---|
| 73,475 | Thompson | Jan. 21, 1868 |
| 415,486 | Warnick | Nov. 19, 1889 |
| 572,811 | Krauth | Dec. 8, 1896 |
| 768,936 | Gaedtke | Aug. 30, 1904 |
| 1,432,300 | Pytlak | Oct. 17, 1922 |
| 1,948,601 | Thomas | Feb. 27, 1934 |